United States Patent [19]

Gallet et al.

[11] Patent Number: 4,681,343
[45] Date of Patent: Jul. 21, 1987

[54] REAR AXLE ASSEMBLY FOR SUSPENSION OF MOTOR VEHICLES

[75] Inventors: Patrick Gallet, Les Ulis; Henri Galles, Aulnay sur Mauldre, both of France

[73] Assignee: Regie Nationale Des Usines Renault, Boulogne Billancourt, France

[21] Appl. No.: 821,970

[22] Filed: Jan. 24, 1986

[30] Foreign Application Priority Data

Apr. 19, 1985 [FR] France ............... 85 05975

[51] Int. Cl.⁴ .................. B60G 11/46; B60G 3/00
[52] U.S. Cl. ................................. 280/699; 280/718
[58] Field of Search .............. 280/669, 694, 699, 718, 280/720, 715; 267/18, 19 R, 19 A

[56] References Cited

U.S. PATENT DOCUMENTS

| 1,280,236 | 10/1918 | Killen | 267/19 R |
| 1,561,083 | 11/1925 | Kettering | 280/717 |
| 2,097,438 | 11/1937 | Best | 267/19 A |
| 3,034,802 | 5/1962 | Axtmann | 280/694 |
| 3,860,259 | 1/1975 | Allison et al. | 280/720 |

FOREIGN PATENT DOCUMENTS

| 3122417 | 12/1982 | Fed. Rep. of Germany . |
| 3338467 | 2/1985 | Fed. Rep. of Germany . |
| 2528364 | 12/1983 | France . |
| 2543073 | 9/1984 | France . |
| 12747 | 1/1901 | Sweden ............... 280/718 |

Primary Examiner—John J. Love
Assistant Examiner—Karin L. Ferriter
Attorney, Agent, or Firm—Oblon, Fisher, Spivak, McClelland, & Maier

[57] ABSTRACT

Rear axle assembly for the suspension of motor vehicles. An arm consisting of a hollow box, provides support by its lower box face to one of the ends of a spring leaf extending therein. The other end of the leaf spring is connected to the body by a shackle.

4 Claims, 4 Drawing Figures

REAR AXLE ASSEMBLY FOR SUSPENSION OF MOTOR VEHICLES

BACKGROUND OF THE INVENTION

This invention relates to a suspension rear axle assembly for a motor vehicle. Rear axle assemblies having a flexible axle whose suspension is provided by torsion bars or helical springs are already known. The drawback of the torsion bars results from the necessity of providing corresponding anchorages in the body, which must bear not only the weight of the vehicle, but also the resultant torque moments due to the torsion bars. This requires local reinforcements of the body which increases the cost and the weight of the assembly.

The use of helical springs also requires the use of reinforcements at the level of the supports of the springs, either by a floor locally secured by side rails, or by enlarged wheel housings dimensioned as a result, with the same drawbacks of increased cost and weight. Moreover, the enlarged wheel housings reduce the size of the trunk.

SUMMARY OF THE INVENTION

The rear axle assembly according to this invention eliminates the above drawbacks. It is remarkable for its light weight, the large available volume that it allows for the trunk, and the capability of easy and robotized mounting that it provides.

The rear axle assembly includes a suspension having a box section trailing arm pivoted to the vehicle body about a transverse axis. A leaf spring has one end connected to the vehicle body by a shackle and the other end extending rearwardly and fitting into the box section of the trailing arm. A clevis is fixed to a mid portion of the leaf spring and also pivoted about that axis while resting against a cross member of the vehicle body. As a result, the weight of the vehicle which tends to cause the trailing arm to pivot is resisted by the end of the leaf spring pressing against an inner surface of the box section. An elastomeric pad is positioned between the end of the leaf spring and the surface of the box section.

The pivoting of the trailing arm and clevis about the axis is provided by a shaft extending along the axis. The trailing arm and the clevis are mounted on the shaft by separate elastic connections. The connection for the trailing arm is more flexible than that for the clevis. Preferably, the leaf is formed of reinforced composite material and the suspension is fastened to the vehicle body by vertically arranged fastenings.

BRIEF DESCRIPTION OF THE DRAWINGS

Various other objects, features and many attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF THE PREFERRED EMBODIMENTS

Figure 1:
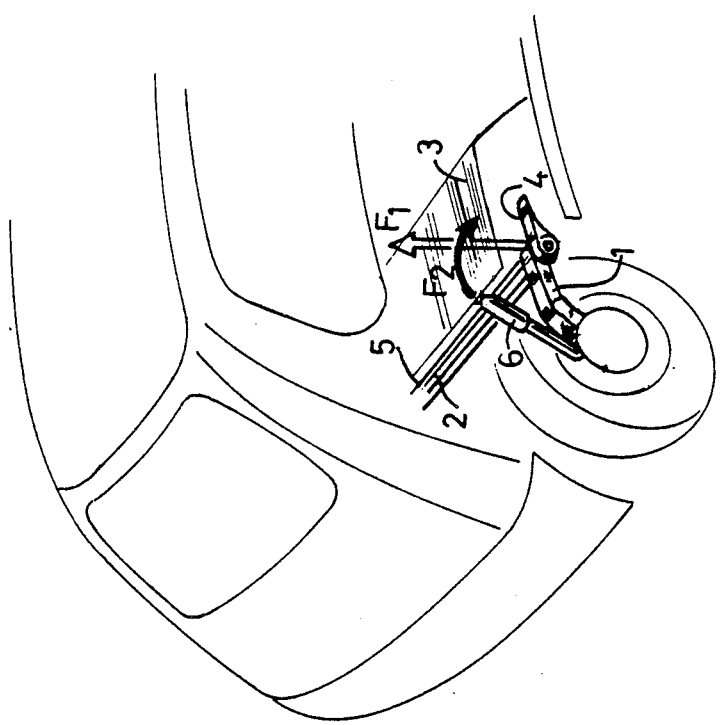

The rear axle assembly illustrated in FIG. 1 essentially consists of a flexible axle fixed to a torsion bar system 2. The rear axle assembly includes a trailing arm fixed to the torsion bar system, a connecting element 5 extending to the opposite axle assembly and a shock absorber 6. The rear axle assembly is fixed to body 3 by an anchoring member 4, which must bear the forces along F1 and the moments along F2 at the same time. Therefore, this requires the reinforcements mentioned above.

Figure 2:
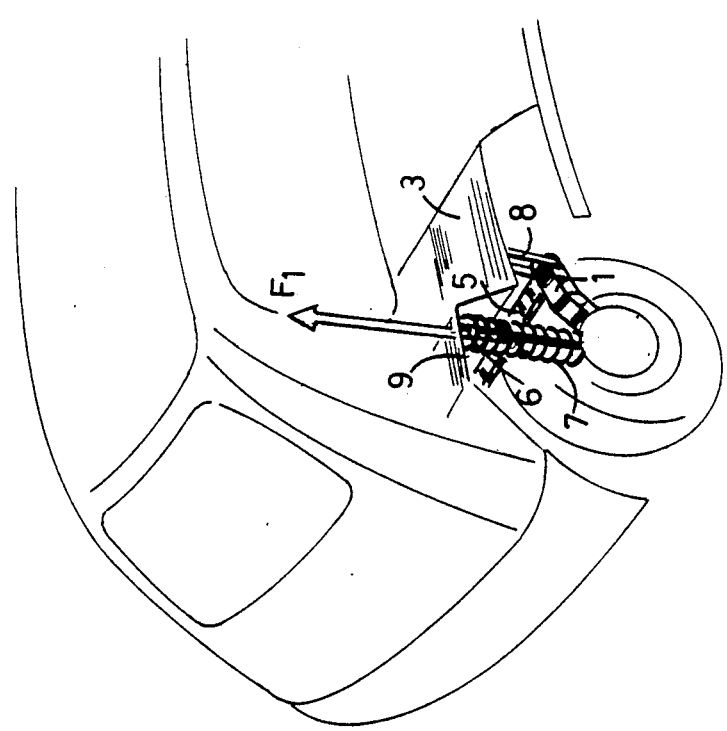
FIGS. 1 and 2 are exploded views in perspective of a rear axle assembly according to the prior art.

The rear axle assembly according to FIG. 2 includes a flexible axle, having a trailing arm 1, a connecting element 5 extending to the opposite axle assembly, a vertical shock absorber 6 and a helical spring 7 which is concentric with the spring.

The above unit is fastened to the floor of body 3 by crossmember 8. Specific reinforcements 9 are provided in the wheel housing to absorb forces F1 at the support of spring 7. Additional volume thus must be taken from the available volume of the trunk.

Figure 3:
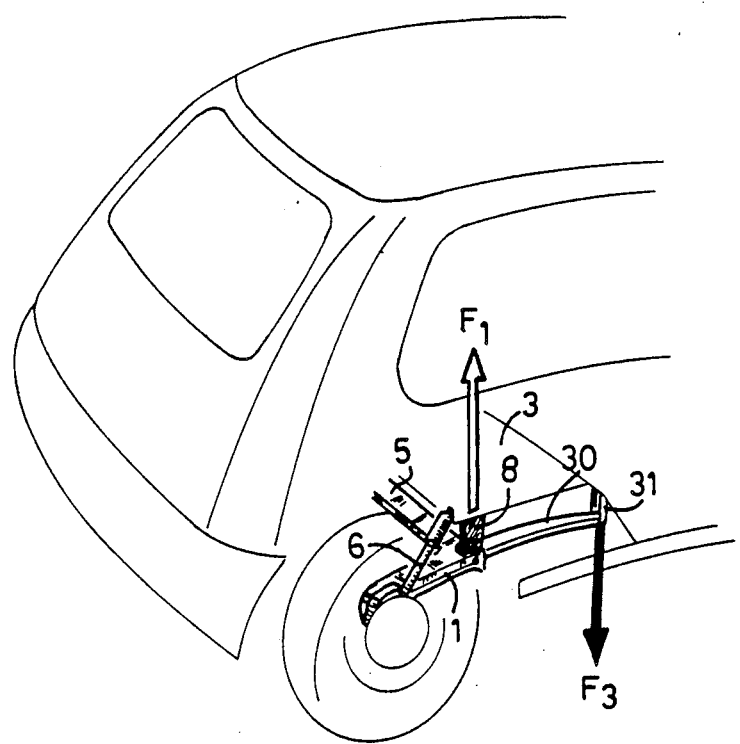
FIG. 3 is an exploded view of the rear axle assembly according to the invention.
Figure 4:
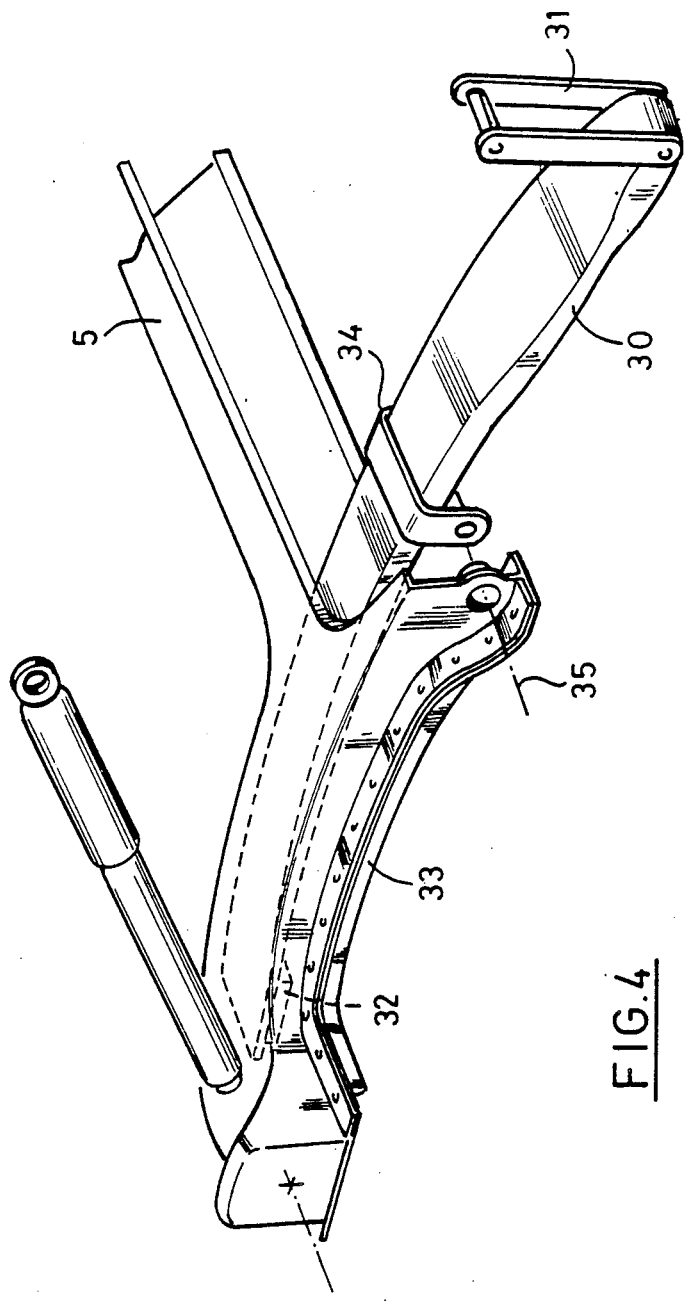
FIG. 4 is a partial view in perspective of the half-assembly of FIG. 3.

In the rear axle assembly of the invention, illustrated in FIGS. 3 and 4, the flexible axle consists of trailing arms 1, connecting element 5 and shock absorber 6. Particularly in FIG. 4, it is seen that trailing arm 1 is a box-like section arm 33. The suspension includes a leaf spring 30 that works by bending, connected by a shackle 31 to body 3. Its opposite end fits within box 33 and is pressed via an elastomer pad 32 on the lower inner box surface of arm 33, which thus supports suspension forces F3. The arm 33 is connected to the body by pivoting about shaft 35 which is itself fixed to the body. This arrangement of leaf 30 inside arm 33 makes possible a reduced size of the unit.

A clevis 34, mounted on the leaf 30 near the center of leaf, is hinged on the same shaft 35 that fastens arm 33 to the body. However, since clevis 34 and arm 33 are hinged at separate places on the same shaft 35, two different types of elastic hinges can be used, a more rigid one for clevis 34 which must absorb the longitudinal and vertical forces of leaf 30, and a more flexible one for arm 33 which, by so being disengaged from the above forces, is better suited to damping the vibrations coming from the wheel mounted to the other end of the trailing arm.

Since leaf 30 fits into the box section of arm 33, it resists clockwise pivoting of arm 33 about shaft 35 (as seen in FIG. 4). Such pivoting causes the end of leaf 30 to be pressed by the lower inner box face of arm 33 and pad 32, and so bends the leaf 30 about the axis of shaft 35. Such bending of the leaf, and so such pivoting of the arm 33, is resisted by the resilience of the leaf.

The upper part of clevis 34 rests on a naturally reinforced zone, consisting, for example, of rear crossmember 8, and does not necessitate an additional reinforcement part.

The function of shackle 31 is to absorb the variations in length of leaf 30 during movement and to guide it crosswise.

A height of the rear of vehicles of various weights can be kept constant for a given leaf 30 by using shackles of various lengths.

Preferably, leaves of reinforced synthetic material of the "composite" type are used, making possible a very considerable weight reduction as compared to helical springs or to conventional metal leaves.

It will be noted that the volume available for the trunk is not reduced by the presence of housings, or of particular reinforcements, and can be very large due to the compactness of the suspension.

Finally, it will be noted that all bolted fastenings of the assembly to the body can be inserted vertically, thus facilitating their robotized automatic mounting.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A vehicle suspension comprising:
    a box section trailing arm having box section surfaces, said arm further including an open end pivoted to a body of said vehicle about a fixed axis, as well as an end opposite said open end and including means for attachment of a road wheel thereto;
    a leaf spring having one end connected to said vehicle body by a shackle and having another end fitting through said open end and into said box section of said trailing arm;
    a clevis fixed to a mid portion of said leaf spring and pivoted about said axis, said clevis being positioned to rest against a crossmember of said body, whereby said another end of said leaf spring is pressed towards a lower interior surface of said box section; and
    pad means positioned between said another end of said leaf spring and said lower surface of said box section.

2. The suspension of claim 1 wherein said arm and said clevis are separately pivoted on a shaft extending along said axis by separate elastic connection means, said connection means for said arm being more flexible than said connection means for said clevis.

3. The suspension of claim 1 wherein said leaf is of reinforced composite material.

4. The suspension of claim 1 wherein said suspension is fastened to said body by vertically arranged fastenings.

* * * * *